No. 876,780. PATENTED JAN. 14, 1908.
W. G. DOUGHERTY.
WATER ELEVATOR.
APPLICATION FILED JULY 19, 1907.

5 SHEETS—SHEET 1.

WITNESSES

INVENTOR
WILLIAM G. DOUGHERTY
BY Munn & Co.
ATTORNEYS

No. 876,780. PATENTED JAN. 14, 1908.
W. G. DOUGHERTY.
WATER ELEVATOR.
APPLICATION FILED JULY 19, 1907.

5 SHEETS—SHEET 2.

WITNESSES
F. E. Barry
Percy B. Turpin

INVENTOR
WILLIAM G. DOUGHERTY
BY Munn & Co.
ATTORNEYS

No. 876,780.  
W. G. DOUGHERTY.  
WATER ELEVATOR.  
APPLICATION FILED JULY 19, 1907.
PATENTED JAN. 14, 1908.
5 SHEETS—SHEET 3.
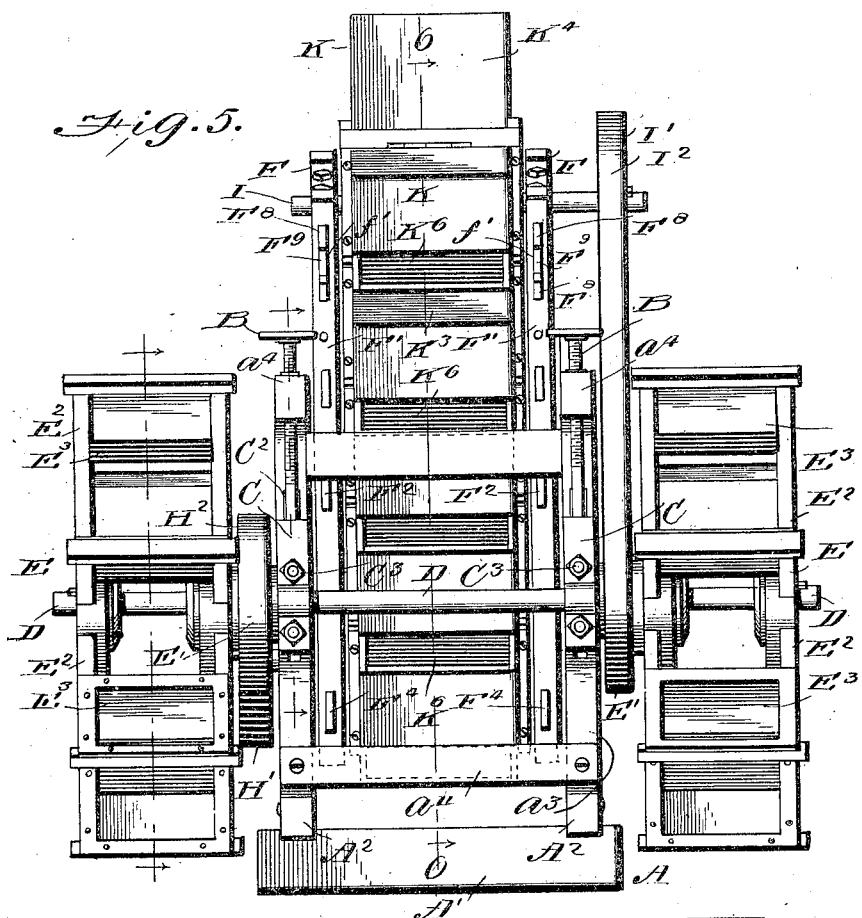
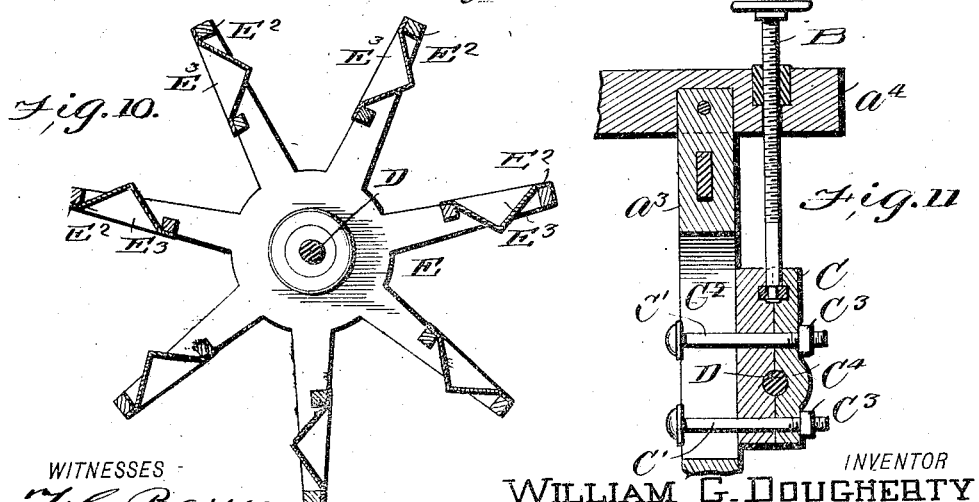
WITNESSES  
F. C. Barry  
Perry B. Turpin
INVENTOR  
WILLIAM G. DOUGHERTY  
BY Munn & Co.  
ATTORNEYS No. 876,780. PATENTED JAN. 14, 1908.
W. G. DOUGHERTY.
WATER ELEVATOR.
APPLICATION FILED JULY 19, 1907.
5 SHEETS—SHEET 4.
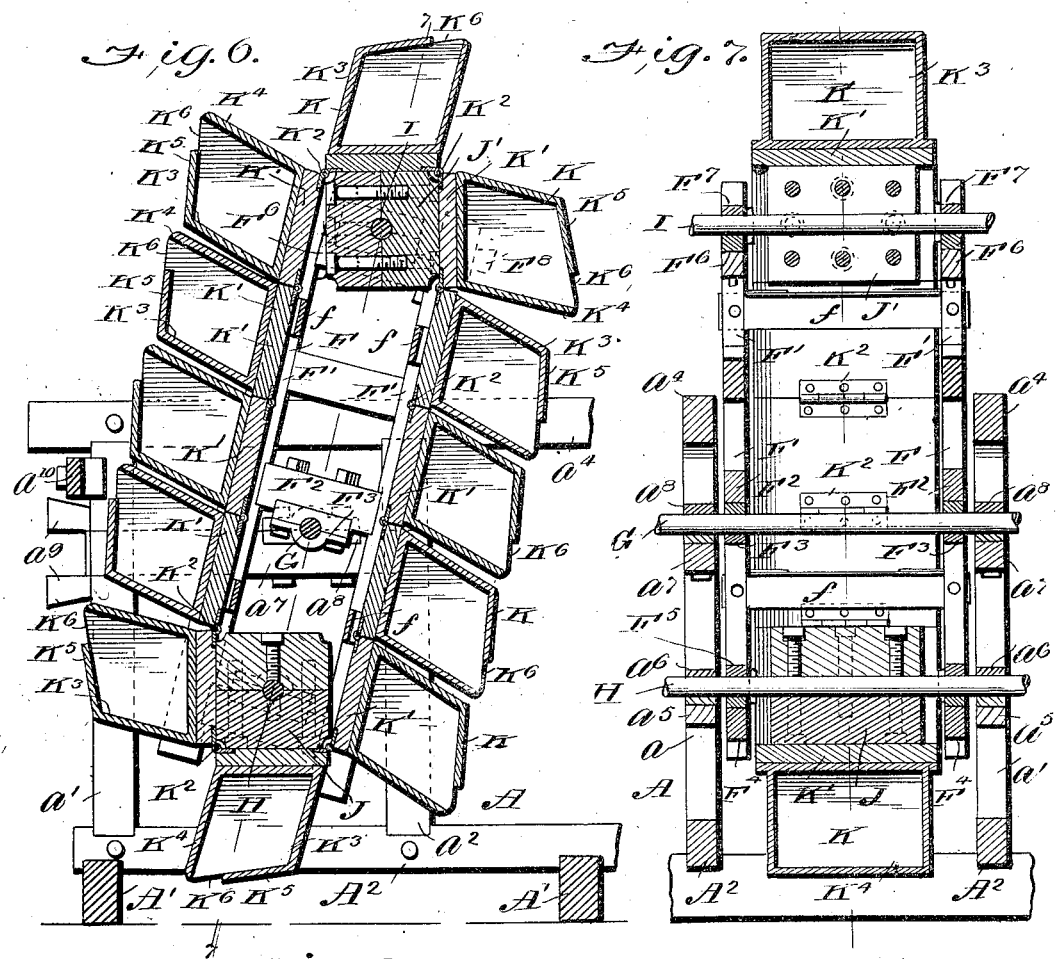
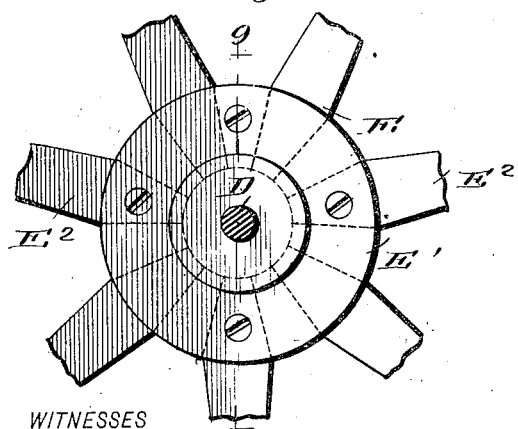
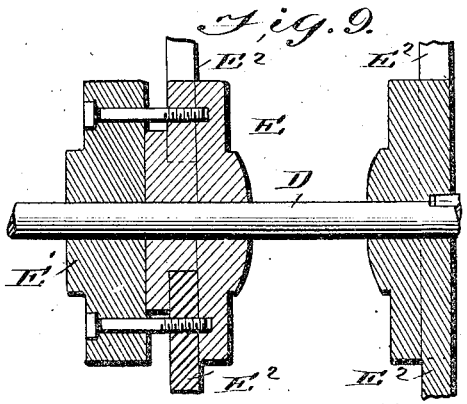
WITNESSES
INVENTOR
WILLIAM G. DOUGHERTY
BY
ATTORNEYS No. 876,780. PATENTED JAN. 14, 1908.
W. G. DOUGHERTY.
WATER ELEVATOR.
APPLICATION FILED JULY 19, 1907.

5 SHEETS—SHEET 5.

WITNESSES
F. C. Barry
Perry B. Turpin

INVENTOR
WILLIAM G. DOUGHERTY
BY Munn & Co.
ATTORNEYS

UNITED STATES PATENT OFFICE.

WILLIAM GEORGE DOUGHERTY, OF POCATELLO, IDAHO.

WATER-ELEVATOR.

No. 876,780.

Specification of Letters Patent.

Patented Jan. 14, 1908.

Application filed July 19, 1907. Serial No. 384,540.

*To all whom it may concern:*

Be it known that I, WILLIAM G. DOUGHERTY, a citizen of the United States, and a resident of Pocatello, in the county of Bannock and State of Idaho, have invented certain new and useful Improvements in Water-Elevators, of which the following is a specification.

My invention is an improvement in elevators designed especially for use in irrigation; and the invention consists in certain novel constructions and combinations of parts, as will be hereinafter described and claimed.

Figure 1:
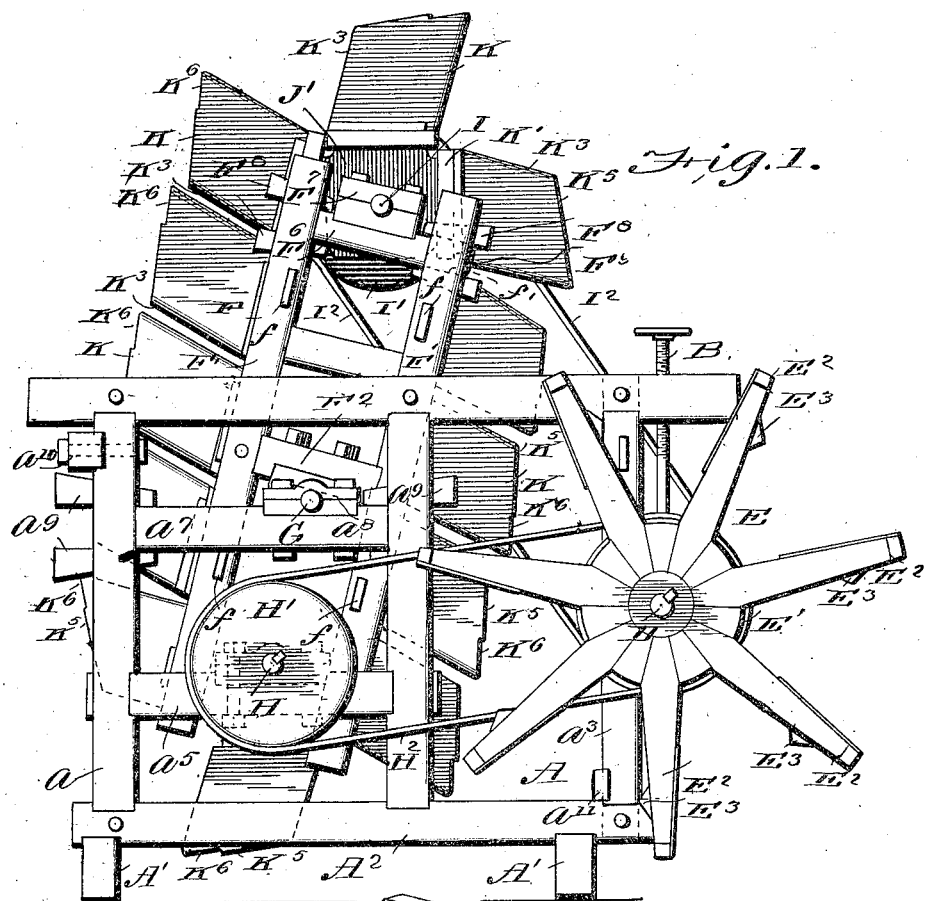
Figure 2:
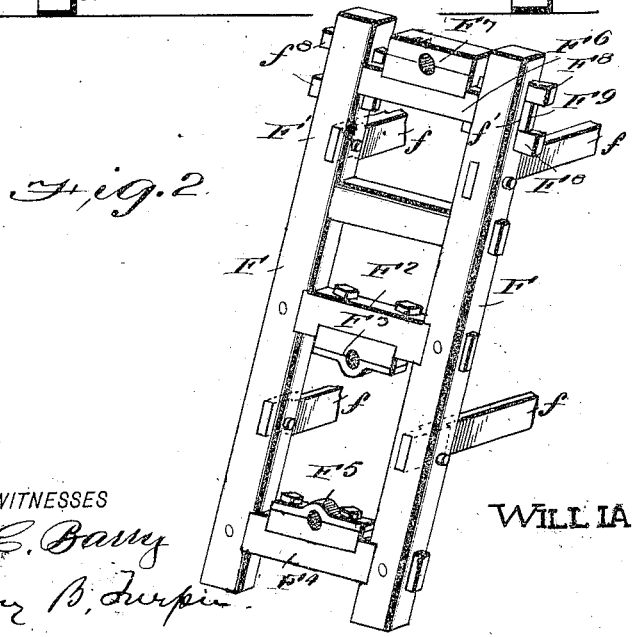
Figure 3:
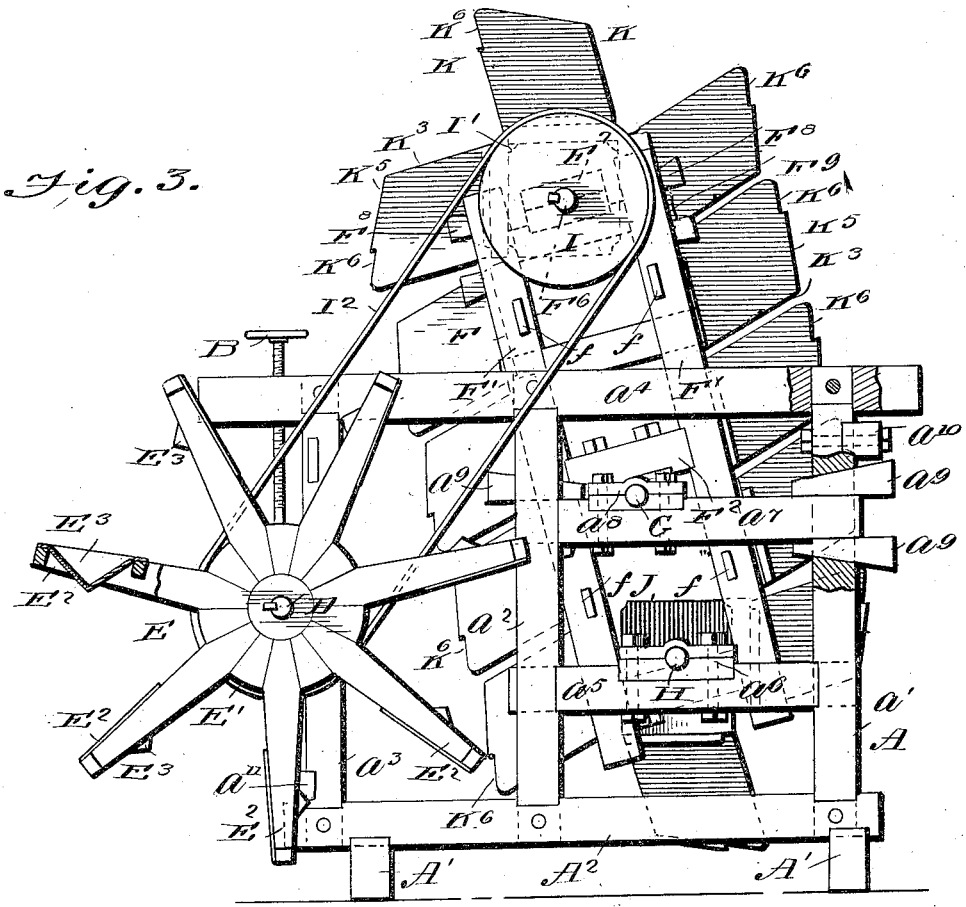
Figure 4:
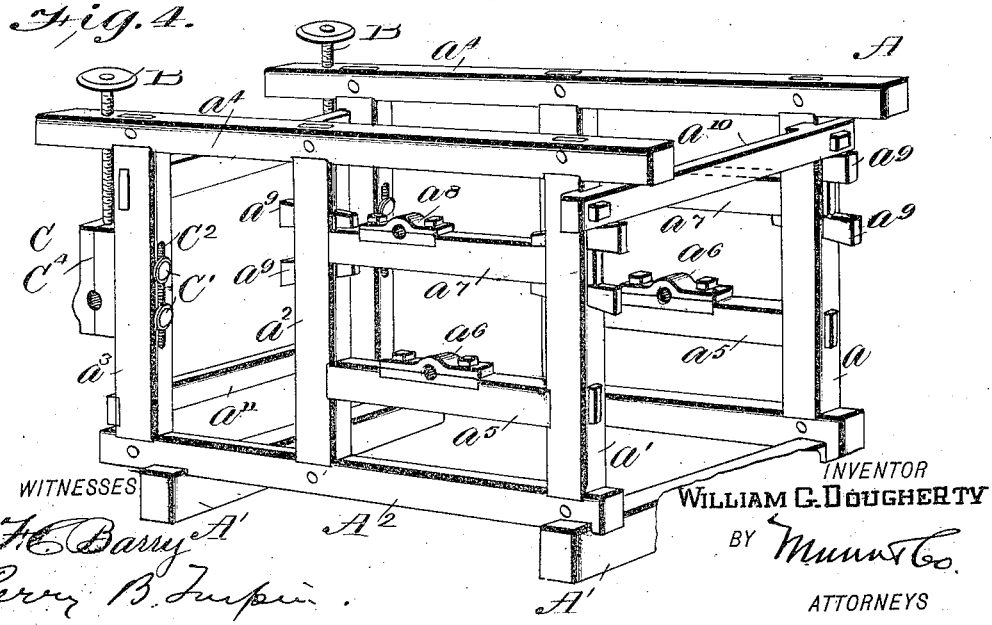
Figure 12:
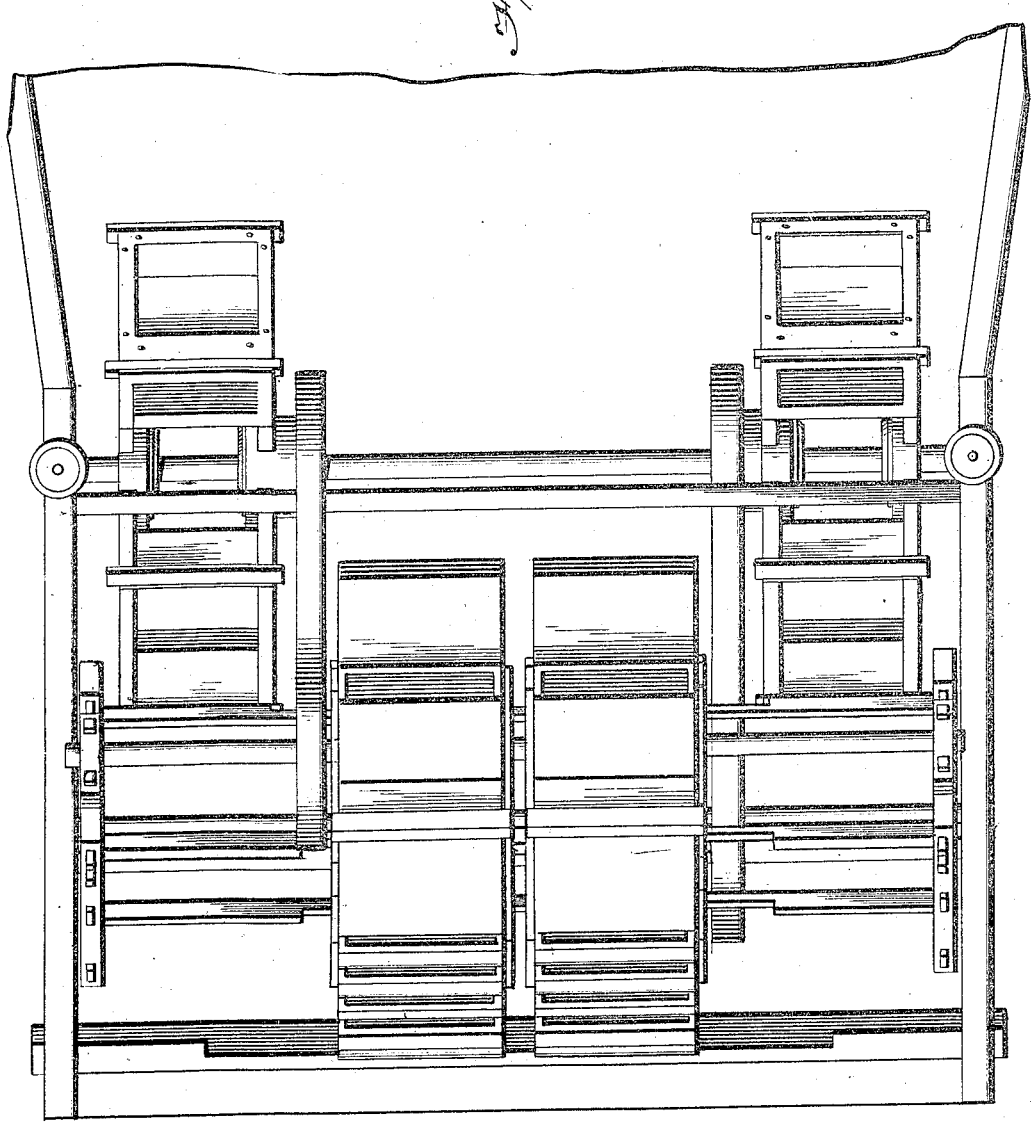

In the drawing Figure 1 is a side view of an apparatus embodying my invention. Fig. 2 is a detail perspective view of a portion of the elevator frame. Fig. 3 is a side elevation of the apparatus from the opposite side to that shown in Fig. 1. Fig. 4 is a detail perspective view of the main frame. Fig. 5 is a front elevation of the apparatus. Fig. 6 is a vertical longitudinal section on about the line 6—6 of Fig. 5. Fig. 7 is a vertical cross-section on about line 7—7 of Fig. 6. Fig. 8 is a detail side view of the central portion of one of the current wheels. Fig. 9 is a detail section on about line 9—9 of Fig. 8. Fig. 10 is a cross-section of one of the current wheels. Fig. 11 illustrates in detail the means for raising and lowering the drive shaft and Fig. 12 is a top plan view of the apparatus illustrating a somewhat different construction from that illustrated in the other figures of the drawing.

In carrying out my invention I employ a main frame A as shown in detail in Fig. 4, and comprising sills A', longitudinal base bars A$^2$ on said sills, uprights $a'$, $a^2$, $a^3$ mounted on the base bars A$^2$, top bars $a^4$ extending longitudinally upon and secured to the upper ends of the uprights, bearing bars $a^5$ having boxes $a^6$ for the lower shaft of the elevator, bridge bars $a^7$ having boxes $a^8$ for the intermediate or supporting shaft of the elevator and keys $a^9$ between the ends of the bridge bars and the uprights of the main frame whereby the bridge bars $a^7$ may be adjusted up or down for a purpose more fully described hereinafter. The uprights $a'$ are connected near their upper ends by a cross-bar $a^{10}$ and a cross-bar $a^{11}$ connects the uprights $a^3$ near their lower ends, these cross-bars $a^{10}$ and $a^{11}$ operating to brace and strengthen the main frame as will be understood from the foregoing description.

The top bars $a^4$ are provided with threaded bearings in which turn the upright screws B, see Figs. 4 and 11, and these upright screws are swiveled at their lower ends to boxes C, so the said boxes may be set up and down, bolts C' extending through slots C$^2$ in the uprights $a^3$ of the main frame and connected with the boxes so the boxes may be adjusted up or down by the screws B and then clamped in any desired adjustment by tightening the nuts C$^3$ on the bolts C''. These boxes C are provided with bearings C$^4$ for the drive shaft D which carries the water wheels E so the said water wheels may by the operation of the screws B be set up or down to adjust the driving wheels to high or low water as may be found necessary. The shaft D extends laterally at both ends beyond the main frame and carries the wheels E which latter are provided with the pulleys E' to receive belts.

The wheels E have the outwardly projecting arms E$^2$ on which are secured the buckets E$^3$ which are V shaped in cross-section as best shown in Fig. 10 of the drawings, forming a trough-like structure extending the full length of the buckets which will operate to receive the force of the current in order that the wheels may be operated with the full strength of the current in the operation of the invention.

The elevator frame comprises two side frames F having the longitudinal bars F' provided with a central beam F$^2$ having a box F$^3$ forming a bearing for the pivot shaft G which is mounted in the bearings $a^8$ of the main frame. This shaft G forms the main support for the elevator frame, the side frames of which are connected by the cross-bars $f$, see Fig. 2, and the side frames are provided at their lower ends with beams F$^4$ supporting the boxes F$^5$ for the lower shaft of the elevator and at their upper ends with the bridge or saddle beams F$^6$ having the box F$^7$ for the upper shaft or the elevator, as will be understood from Figs. 1, 2 and 3. The beams F$^6$ are adjustable within the side frames by fitting the ends thereof in mortises $f'$ in the upright side bars F' and providing keys F$^8$ above and below the tenon F$^9$ at the ends of the saddle-beams F$^6$. The bridge or saddle beams $a^7$ of the main frame are similarly adjustable in a vertical direction as before described and this adjustment is an important feature of my invention as will more fully appear hereinafter. At its lower end the elevator frame has a cross-shaft H held in the boxes F$^5$ of the same frame and also in the boxes $a^6$ of the main frame and provided with a pulley H' connected by a belt H² with the corresponding pulley E' of the drive shaft. The elevator frame also has an upper shaft I journaled in the boxes F⁷ and provided with a pulley I' connected by a belt I² with the other pulley of the drive shaft, the said pulleys of the drive shaft being in direct connection with their respective wheels, as before described. On the shafts H and I, respectively, I secure wheels J and J' around which the endless elevator passes and by which it is driven in the operation of the invention, as will be understood from Fig. 6 of the drawings. As shown the elevator proper comprises a series of buckets K having base blocks K' which are hinged together at K² at their meeting ends forming an endless chain and the buckets are constructed, as best shown in Figs. 1, 3 and 6 with the lower side plates K³, the top plates K⁴, and the front plates K⁵, the latter inclining upwardly from the outer ends of the lower side plates nearly to the outer ends of the top plates K⁴ leaving an opening K⁶ through which the water discharges after the buckets have reached their uppermost position and start to descend. This construction is important as the buckets will fill readily in passing through the water, will hold the water securely as they ascend, and will rapidly discharge the water, the top plates K⁴ being inclined to facilitate the discharge of the water from the buckets as the buckets start to descend. Any suitable form of receptacle may be arranged to receive the water from the buckets as they discharge at the upper end of their descending movement.

It will be noticed that my invention involves no complicated gearing likely to get out of order, the different parts which are connected being united by a direct connection and so constructed as to prevent them from getting out of order in the ordinary use of the invention.

In operation when the apparatus is located and suitably anchored in a stream of flowing water the water will turn the drive wheels which by the belt gearing described will operate to turn the elevator, the water acting with force upon the concave paddle blades and the connections from the drive shaft to the upper and lower ends of the elevator will operate to equalize the strain on the apparatus and thus increase the power and improve the running of the apparatus in the use thereof.

It will be noticed that the elevator shaft at the base thereof moves in two sets of boxes, one on the elevator frame and one on the main frame so that the elevator frame is securely connected at its lower end with the main frame and is steadied by such connection, and the intermediate bearing presently described, in position so that the lower pulley of the elevator will be maintained in proper position to be driven by the belt H² in the operation of the invention as before described.

Between its ends the elevator shaft is provided with boxes F³ in which the shaft G is held, the said shaft being also held in the boxes $a^8$ of the main frame. These boxes $a^8$ being carried on the bridge beams $a^7$ and the latter being adjustable vertically by means of the keys $a^9$, as before described, the elevator frame may be raised or lowered by the proper operation of the keys $a^9$ to rest or ease the lower shaft H in its bearings so that the weight of the elevator frame and the entire load thereof may be transferred to the dead or intermediate shaft G thus doing away with the friction which might arise in the boxes carrying the shafts H and I for moving the endless elevator in the use of the invention, thus reducing the power required for the operation of the endless elevator to a minimum. The upper shaft I is also mounted in adjustable bearings has its boxes resting on the bridge or saddle beams F⁶, and may be adjusted by the proper manipulation of the keys F⁸ to raise or lower the shaft whereby to compensate for contraction and expansion in the use of the invention. It will thus be noticed that the elevator frame has an upper shaft and a lower shaft which operate to drive the endless elevator and is also provided with an intermediate shaft, the latter having bearings in the main frame and means being provided in the main frame whereby the said bearings may be raised and lowered for the purpose described.

In Fig. 12 I show a somewhat different construction in which the driving wheels are located within the main frame or casing and the sides and bottom of the latter are closed and inclined outwardly on each side at the front of the apparatus so the whole stream or river can be turned into the casing to operate on the driving wheels, thus acting direct and increasing the speed and force of the current and in this construction I may employ two sets of elevator buckets with the elevator frames at the opposite sides of the main frame, as best shown in said figure:

What I claim is—

1. A water elevator substantially as herein described comprising a main frame, a drive shaft, bearings in the main frame for said drive shaft, means for raising and lowering said bearings, water wheels on the drive shaft, pulleys on the drive shaft at the opposite sides of the main frame, an elevator frame having upper and lower shafts provided with pulleys and with wheels for an endless elevator, belts connecting the pulleys of the upper and lower shafts of the elevator frame with the pulleys of the drive shaft, bearings in the main frame for the lower shaft of the elevator frame, an intermediate shaft projecting from the elevator frame, bearings for said intermediate shaft, means for adjusting said bearings up and down in the main frame, and an endless elevator having buckets and extending around the wheels of the upper and lower shafts of the elevator frame, substantially as set forth.

2. The combination of a main frame, an elevator frame therein, an endless elevator, shafts supporting said endless elevator, pulleys on said shafts, a drive shaft having pulleys geared with the elevator pulleys, and water wheels on the drive shaft and having trough shaped buckets, substantially as set forth.

3. The combination of a main frame, an elevator frame having upper and lower shafts, bearings in the main frame for the lower shaft of the elevator frame, an intermediate shaft projecting from the elevator frame, beams in the main frame having bearings for said intermediate shaft, keys above and below said beams whereby they may be adjusted vertically, an endless elevator in the elevator frame, and a drive shaft, and means for operating the endless elevator therefrom, substantially as set forth.

4. The combination of a main frame, an elevator frame therein, upper and lower shafts in the elevator frame and provided with wheels for supporting and operating an endless elevator, an endless elevator extending around said wheels and having buckets, pulleys on the upper and lower shafts of the elevator frame, a drive shaft journaled in the main frame and having water wheels and pulleys, and belts connecting the pulleys of the drive shaft, respectively with the pulleys on the upper and lower shafts of the elevator, substantially as set forth.

5. In a water elevator the combination of a main frame, an elevator frame, an endless elevator carried by the frame, upper and lower shafts in the elevator frame for driving the endless elevator, and an intermediate shaft projecting from the elevator frame, bearings in the main frame for said shaft, and means for adjusting said bearings up and down in the main frame, substantially as set forth.

6. The combination of a main frame, an elevator frame therein and having an endless elevator, upper and lower shafts having bearings in the elevator frame and provided with means for supporting and operating the endless elevator, bearings in the main frame for the lower shaft of the elevator frame, an intermediate shaft projecting from the elevator frame between the upper and lower shafts thereof, beams in the main frame having bearings for said intermediate shaft, and means for raising and lowering said beams, substantially as set forth.

7. The combination of a main frame, an elevator frame therein, upper and lower shafts having bearings in the elevator frame, means for adjusting the bearings for the upper shaft up and down in the elevator frame, bearings on the main frame for the lower shaft of the elevator frame, an intermediate shaft projecting from the elevator frame between the upper and lower shafts thereof, bearings in the main frame for said intermediate shaft, means for adjusting said bearings up and down in the main frame, and an endless elevator carried by the elevator frame, substantially as set forth.

8. An apparatus substantially as herein described, comprising a main frame, a drive shaft at one end thereof and extending beyond the main frame, current wheels and pulleys on said extensions of the drive shaft lateral to the main frame, an elevator frame, means for supporting the elevator frame within the main frame, upper and lower shafts in the elevator frame and having means supporting the endless elevator, pulleys on the upper and lower shafts and arranged at opposite sides of the elevator frame, and belts connecting said pulleys with the pulleys of the drive shaft, all substantially as and for the purpose set forth.

WILLIAM GEORGE DOUGHERTY.

Witnesses:
CHARLES E. WRIGHT,
CHARLES W. POMEROY.